United States Patent
Grimm et al.

(10) Patent No.: US 6,419,134 B1
(45) Date of Patent: Jul. 16, 2002

(54) DEVICE FOR DETACHABLE FASTENING OF A LOAD CARRIER ON A VEHICLE

(75) Inventors: Rainer Grimm; Horst Böhm, both of Frankfurt (DE)

(73) Assignee: Meritor Automotive GmbH, Frankfurt (DE)

( * ) Notice: Subject to any disclaimer, the term of this patent is extended or adjusted under 35 U.S.C. 154(b) by 0 days.

(21) Appl. No.: 09/654,279

(22) Filed: Sep. 1, 2000

(30) Foreign Application Priority Data

Sep. 30, 1999 (DE) .......................................... 199 47 237

(51) Int. Cl.$^7$ ................................................. B60R 9/04
(52) U.S. Cl. ........................ 224/331; 224/309; 224/326
(58) Field of Search ................................ 224/309, 322, 224/326, 329, 331

(56) References Cited

U.S. PATENT DOCUMENTS

| | | | |
|---|---|---|---|
| 4,475,765 A | | 10/1984 | Vogt et al. |
| 5,232,138 A | * | 8/1993 | Cucheran ................ 224/326 X |
| 5,806,735 A | * | 9/1998 | Christiansson et al. ..... 224/322 |
| 5,975,391 A | * | 11/1999 | Aftanas et al. ............. 224/309 |
| 6,182,876 B1 | * | 2/2001 | Moliner .................. 224/322 X |

FOREIGN PATENT DOCUMENTS

| | | | |
|---|---|---|---|
| DE | 1266157 | 4/1968 | |
| DE | 3614740 C2 | 5/1987 | |
| DE | 4007263 A1 | 9/1990 | |
| DE | 4027452 A * | 3/1992 | .................. 224/331 |
| DE | 4320762 A1 * | 1/1994 | .................. 224/331 |
| DE | 4402217 A1 * | 8/1994 | .................. 224/329 |
| DE | 4423607 C1 | 6/1995 | |
| DE | 19709016 C2 | 10/1998 | |
| DE | 3720403 A1 | 12/1998 | |
| EP | 503310 A * | 9/1992 | .................. 224/329 |

* cited by examiner

Primary Examiner—Gregory M. Vidovich
(74) Attorney, Agent, or Firm—Carlson, Gaskey & Olds

(57) ABSTRACT

A device for a detachable fastening of a load carrier (10) on a vehicle, in particular a roof rack, is disclosed, which has a carrier frame (18), on which two retaining elements (20, 22) are fitted, which are relatively mobile to one another when the load carrier (10) is in unfastened condition. When the load carrier (10) is in fastened condition the retaining elements (20, 22) engage in a gap (24) between a body frame on the vehicle side (26) and a flat body part (12) attached to this, where they interlock on a fastening element (28) on the body frame (26). The result is that the load carrier (10) can be fastened to the vehicle easily and securely.

6 Claims, 2 Drawing Sheets

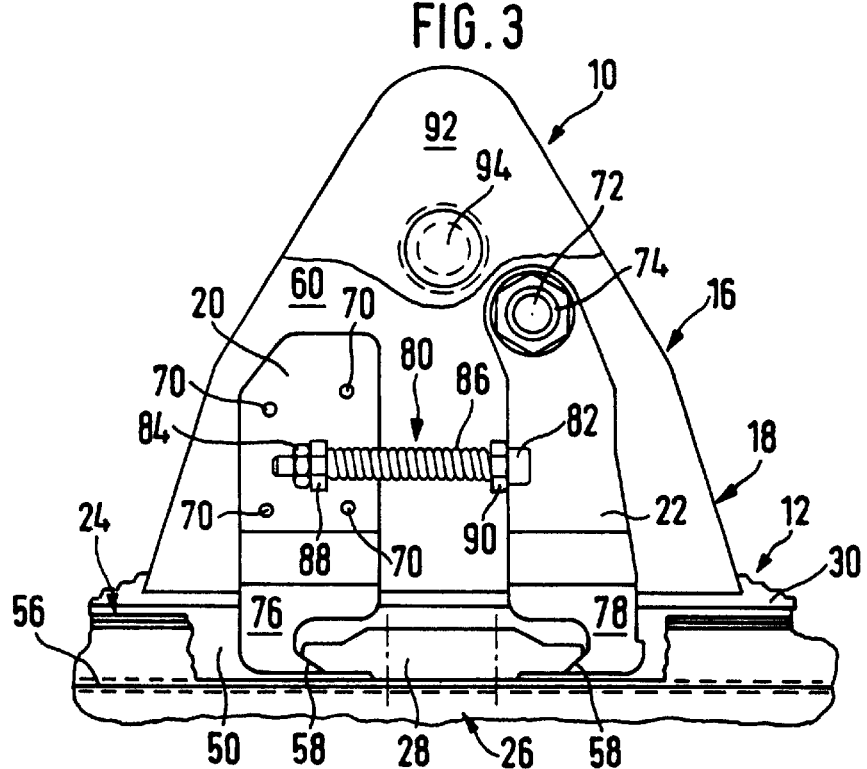
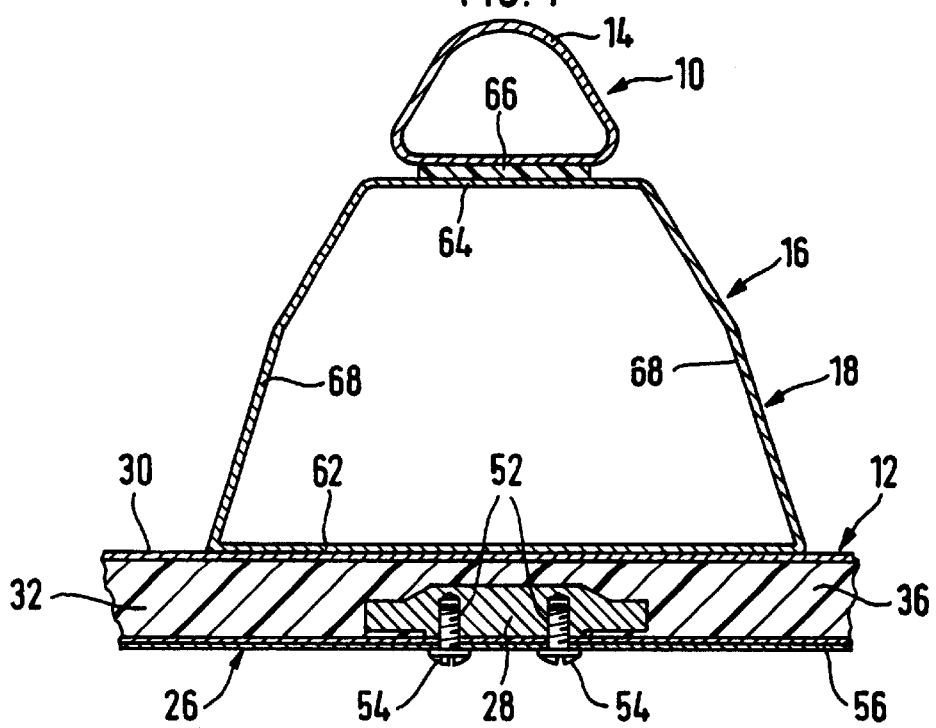

DEVICE FOR DETACHABLE FASTENING OF A LOAD CARRIER ON A VEHICLE

BACKGROUND OF THE INVENTION

The invention relates to a fastener for detachable fastening of a load carrier on a vehicle, in particular, to or on a motor vehicle roof. The invention also relates to a device therefor, to a load carrier and to a vehicle.

Roof racks are used in very different designs, in order to transport loads on the roof of a vehicle, such as container boxes, bicycles, boats, skis etc. In general, there are two roof load carriers each fitted with a long tie bar, fitted in a transverse direction on the vehicle over its roof and provided at both ends with a load carrier foot. The two roof load carriers are fastened to the vehicle by the load carrier feet in the longitudinal direction of the vehicle and at a certain distance from one another. With the current technical state-of-the-art there is no shortage of proposals as to how such a load carrier foot fastening is to be designed. For a vehicle roof fitted with a roof rail the transverse tie bar of the roof rack has clamp or clip type end sections which, when the roof rack is in assembled condition, interlock on the roof rail in the transverse and vertical direction of the vehicle and are frictionally engaged in the longitudinal direction of the vehicle.

For vehicle roofs with an external roof gutter load carrier feet are known (DE - AS 1 266 157) which have an essentially T-shaped fastening plate which is placed in the roof gutter with a rubber or plastic protective cover. In addition, a closure piece angled inwards is fitted here, which can be pulled against the fastening plate by means of a screw which passes through the closure piece and is screwed into the fastening plate. When the load carrier feet are fastened onto the vehicle roof, the roof gutter forms an abutment for the closure piece, i. .e., the closure piece lies on the outside of the roof gutter and the fastening plate is pulled into the roof gutter which lies between the closure piece and the fastening plate by the screw connection between the closure piece and the fastening plate.

A disadvantage of this technical state-of-the-art is seen in the fact that with the friction locking connection between the roof gutter on the one hand and the fastening plate and closure piece on the other hand which is also present in the longitudinal direction of the vehicle, a transduction of force in the longitudinal direction of the vehicle is only possible to a limited extent. If the roof rack is excessively loaded in the longitudinal direction of the vehicle, a longitudinal displacement of the load carrier foot by reference to the vehicle roof occurs, whereby the roof loads can become loose from the roof rack and/or scratches can result on the paintwork of the vehicle roof.

The same problem also exists in known load carrier system for more modern vehicles, which generally do not have an external roof gutter. Such systems have load carrier feet which are provided with a rubber buffer, for example, which can be placed on the vehicle roof. The fastening of the load carrier foot on the vehicle roof is effected here by means of a support plate angled inwards, which can be pulled in the direction of the load carrier foot via a screw connection to the load carrier foot, whereby the angled area of the retaining plate engages in the door cut-out of the vehicle in order to grasp behind the roof frame of the vehicle. Other disadvantages of this technical state-of-the-art lie in the fact that if the support plate is pulled too tightly to the load carrier foot by the screw connection dents can be caused in the vehicle roof, and that due to the gripping of the support plate in the door cut-out the door seal can leak and/or loud noises can develop in the gripping area at high speeds.

Finally, load carrier fasteners have also been proposed (DE 32 02 594 C2, DE 37 20 403 A1), where the fastening elements for the load carrier feet grip through openings formed in the outer shell of the vehicle roof If no roof rack is mounted on the vehicle roof, these openings spoil the optical appearance of the vehicle roof considerably, even if they are closed by plugs, as proposed in DE 02 594 C2. Furthermore, these openings are relatively difficult to seal to ensure that no water can penetrate into the vehicle interior and that the opening edges do not corrode in the case of outer shells made of steel sheet. Finally, there is a not insignificant risk of injury from fastening elements which project to the outside from the roof shell, even when the roof rack has been taken off, as proposed by DE 37 20 403 A1.

SUMMARY OF THE INVENTION

The invention is based on the task of creating a device for a detachable fastening of a load carrier on a vehicle whereby the load carrier can be fastened easily and securely to the vehicle without the problems described above occurring.

This task is solved by the invention. According to the invention, a device for detachable fastening of a load carrier on a vehicle has a carrier frame on which two retaining elements are fitted, which are relatively mobile to one another when the load carrier is in unfastened condition, and which, when the load carrier is in fastened condition, engage in a gap between a body frame on the vehicle side and a flat body part attached to this, where they interlock on a fastening element fixed on the body frame.

This results in the load carrier being fastened to the vehicle in the longitudinal direction by interlocking of the retaining elements with the fastening element, in the transverse direction of the vehicle, on the other hand, in which the lowest forces are to be expected when the load carrier is in use, by interlocking of the retaining elements in the gap between the body frame on the vehicle side and the flat body part attached to this. Forces working in the vertical direction of the vehicle, finally, are supported by the retaining elements and the fastening element on the body frame on the vehicle side. In this way the roof rack is reliably and securely fastened to the vehicle in the longitudinal, transverse and vertical direction of the vehicle, whereby there is no risk of damage caused by fastening the roof rack on to the flat body part, e. g., damage to the paintwork or dents. Furthermore, the proposed roof rack fastening does not touch the door seals in any way. Nor does the fastening element which is accessible through the gap between the body frame and the flat part of the body project over the flat body part when the roof rack is removed, which is an advantage.

Preferably, the flat body part, which can be a vehicle roof or an vehicle roof module, but does not have to be, has a moulded outer shell and an inner shell made of a plastic foam applied on the outer shell, whereby the fastening element for the load carrier is applied to the inner shell at the same time as the foam is applied, so that no additional work stages are needed to fix the fastening element to the body frame on the vehicle side, which is an advantage.

Preferably, the fastening element projects from the flat body part into the gap between the body frame and the body part via an edge on the outer shell. This favours on the one hand simple and uncomplicated construction and assembly of the retaining elements, which do not have to be specially angled and which are simply to be introduced into the gap from the top for assembly. On the other hand the fastening element projecting over the flat body part can also serve as a handling section for the assembly of the body part on to the body frame, which is an advantage.

Of particular benefit is the preferred design, according to which the fastening element serves not only for fastening the load carrier on the vehicle, but also for fastening the flat body part on to the body frame, so that the fastening element fulfils a dual function here. It is appropriate if preferably the fastening element consists of a metal material, and is provided with at least one internal screw thread section, in which a screw is screwed in, which passes through a flange of the body frame when the flat body part is mounted on the body frame.

Preferably, the retaining elements are sheet metal parts which are hook shaped on their ends which engage in the gap, whereby, when the load carrier is fastened, the hook shaped ends interlock in complementary shaped recesses in the fastening element. The retaining elements can therefore be easily and cost-effectively formed by punching or precision blanking and bending.

In a beneficial preferred design, one retaining element is fixed firmly to the carrier frame, whilst the other retaining element is linked to the carrier frame in such a way that it swivels, whereby a device for optional pulling of the swivelable retaining element in the direction of the fixed retaining element is specified. It is appropriate if preferably each retaining element has an abutment with an opening, and the device for optional pulling of the swivelable retaining element in the direction of the fixed retaining element has a cap screw and a nut, whereby the screw passes through the openings of the abutment and its head lies on one abutment, whilst the other end of the screw, which is projecting over the other abutment, is screwed into the fixed nut arranged on the other abutment. In this way the retaining elements can be braced with the fastening element in a defined and simple manner by screwing the screw into the nut. If a screw pressure spring is arranged on the external circumference of the screw, which is supported at the end on the abutments of the retaining element, in order to apply a force pressing the retaining elements apart from one another, the loosening of the retaining elements from the fastening element is also simple. The screw pressure spring has the effect that when the screw is screwed out of the nut, the abutment of the one retaining element is held at the head of the screw and the abutment of the other retaining element is held at the nut, so that this results in the retaining elements being removed from one another and hence from their interlocking grip with the fastening element.

Preferably the retaining elements are covered with a cover fastened to the carrying frame and which is detachable, preferably made of plastic. This cover, which can be adjusted to the vehicle in respect of its external appearance and design, according to the optical and aerodynamic requirements, prevents the fastening device becoming dirty, and therefore guarantees its long term functioning.

In principle, the carrier fame can be distanced from the flat body part when the roof rack is mounted on the vehicle, because the fastening of the roof rack on the vehicle by means of the retaining elements and the fastening element as described above only occurs in the gap between the body frame on the vehicle side and the body part attached to this. It is appropriate, however, if preferably the carrier frame lies flat on the body part, which, among other aspects, facilitates the assembly of the load carrier on the vehicle. A soft intermediate layer made of rubber, for example, can be interposed between the carrier frame and the body part, so that, at all events, there is no danger of scratching the surface of the body part even with this design.

The transverse tie bar of the load carrier can finally be fastened to the carrier frame in the known manner, for instance by the carrier frame having a hollow profile section, the internal cross section of which is formed to complement the external cross section of the transverse tie bar, whereby the transverse tie bar reaches through the hollow profile section and is fastened in respect of the hollow profile section by means of a screw provided on the hollow profile section, and is detachable, so that the distance from the carrier frames attached on both ends of the transverse tie bar can be correspondingly varied to the vehicle dimensions. Preferably, however, the transverse tie bar of the roof rack is fastened to the load carrier by an elastic buffer element, which contributes to the damping and neutralising of vibrations, which occur in particular when the vehicle is travelling at high speed due to the air stream around the loads fastened on the transverse tie bar and are passed into the transverse tie bar. If it is desired here to adjust the transverse tie bar longitudinally, the transverse tie bar can be structured telescopically for this purpose.

BRIEF DESCRIPTION OF THE DRAWINGS

The invention is described in greater detail in the following using an example of a preferred design example, with reference to the attached drawing. The illustrations show the following:

FIG. 3: A truncated lateral and partly opened up cross section view and corresponding to line III—III in FIG. 2 and FIG. 4: A lateral truncated view corresponding to the line IV—IV in FIG. 2.

DETAILED DESCRIPTION OF A PREFERRED EMBODIMENT

Figure 1:
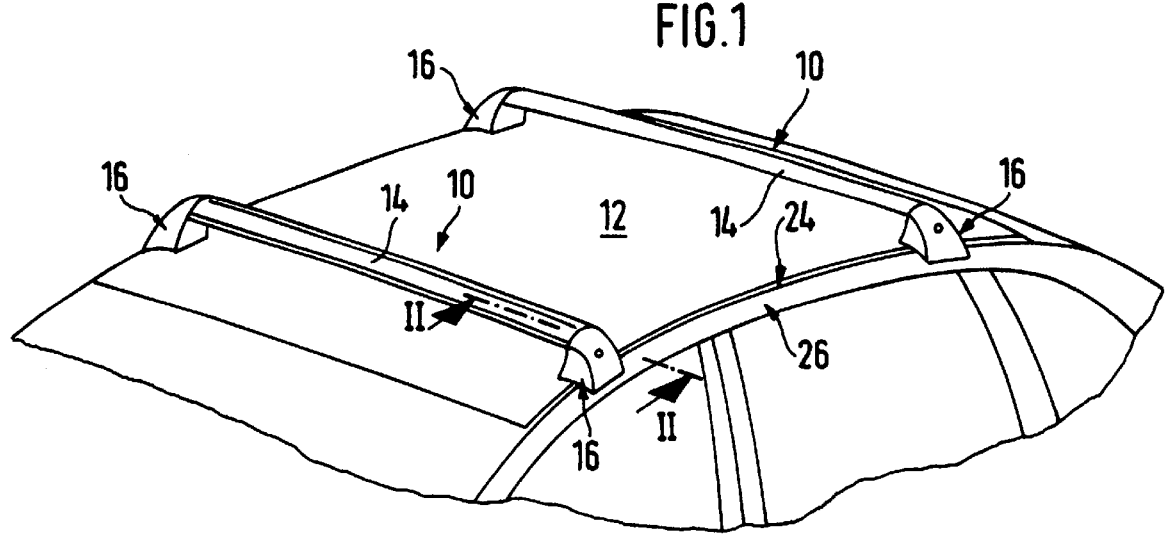
FIG. 1: A schematic perspective view of a vehicle roof attached to a car body to which a roof rack has been assembled using a fastening device as described in the invention.

In FIG. 1 a roof rack system consisting of two load carriers 10 fastened to a vehicle roof 12 is shown schematically. The load carriers 10 are distanced from one another in the longitudinal direction of the vehicle and each have a transverse tie bar 14, which is connected at each of its ends with a load carrier foot 16. As shown in more detail in FIG. 2 and 3, the load carrier foot 16 has a carrier frame 18, on which are two retaining elements 20, 22 which are relatively mobile to one another when the load carrier 10 is in unfastened condition. In the fastened condition of the load carried 10 as shown, the retaining elements 20, 22 engage in a gap 24 between a body frame 26 on the vehicle side and the flat vehicle roof 12 attached to this, where they interlock on a fastening element 28 on the body frame 26, as is described in greater detail in the following.

Figure 2:
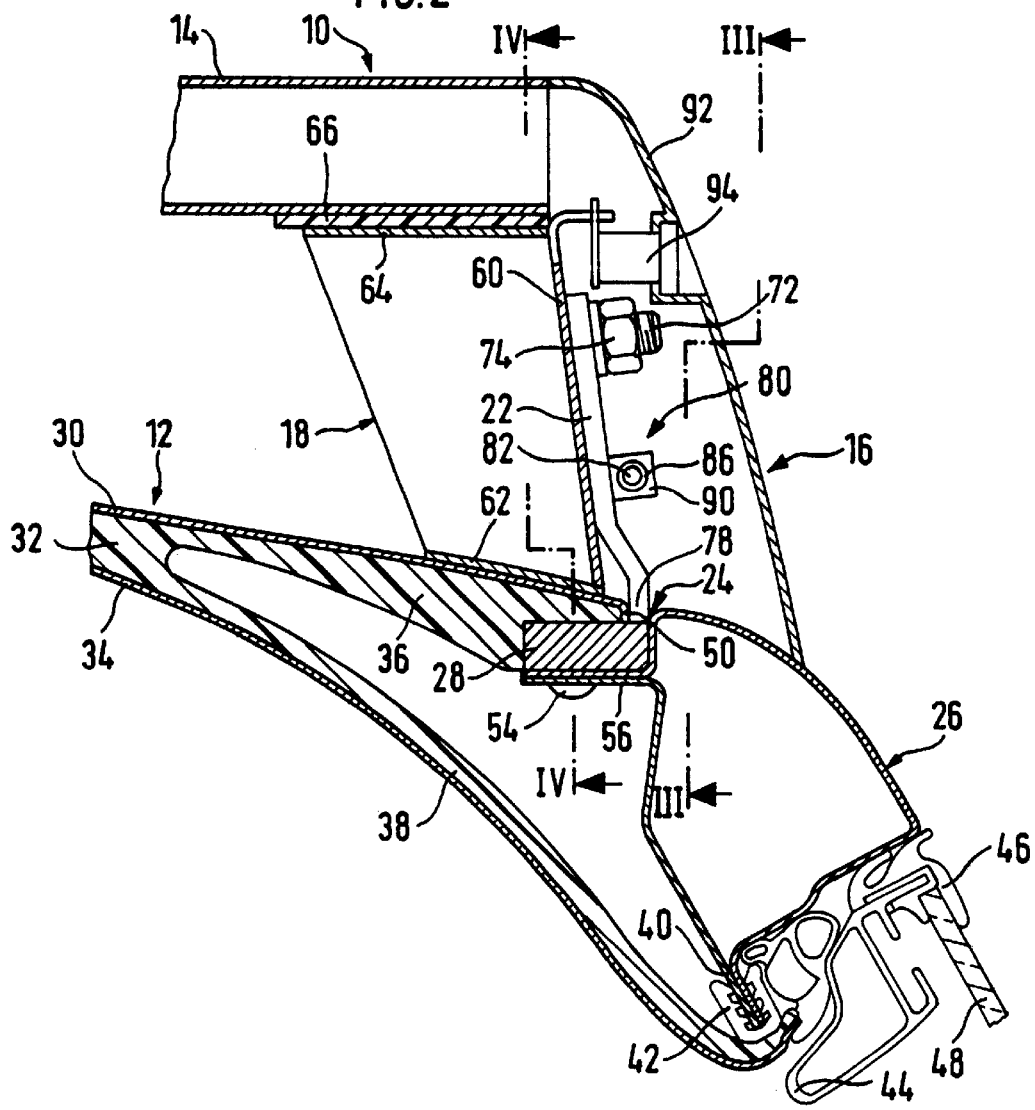
FIG. 2: A truncated cross section view corresponding to the line II—II in FIG. 1.

The vehicle roof 12 has a moulded outer shell or roof skin 30 made of a metal material, e. g. steel sheet, or plastic, and an inner shell 32 which is connected to it in sandwich fashion, which consists of a plastic foam material, for example a PUR foam. The internal surface of the inner shell 32 is coated with a textile or foil type cover material 34 to form the internal roof cover. In addition, the inner shell 32 in the area of the outer edges of the vehicle roof 12 intended for the placing on the body frame 26 is divided into two layers 36, 38, of which the upper layer 36 is sealed on the body frame 26, while the lower layer 38 projects over the outer edges of the vehicle roof 12. The lower layer 38 designed for lining the body frame 26 is bendable for the downwards passage through the body opening bordered by the body frame 26 without permanent deformation, is placed on the surfaces of the body frame 26 facing downwards and inwards and is fastened to the body frame 26 by means of an inner door seal 42 placed on a lower flange 40 of the body frame 26. For better comprehension, a door frame 44, an outer door seal 46 and a door window 48 are also shown in FIG. 2. Here it can be seen clearly that the fastening of the roof rack 10 has no influence on the door seal area.

As can be seen in FIGS. 2 to 4, the fastening element 28, which is preferably made of a metal material, is essentially cuboid in shape, and is applied to the upper layer 36 of the inner shell 32 and projects from the vehicle roof 12 over an external edge 50 (correspondingly recessed at this point) of the external shell 30, in such a way that, when the vehicle roof 12 is mounted on the body frame 26, the fastening element 28 projects into the gap 24 and reaches to the side surface of the body frame 26 facing the fastening element 28. In addition, it can be seen in FIGS. 2 and 4 that the fastening element 28, which serves both for the fastening of the load carrier 10 on the vehicle as well as for the fastening of the vehicle roof 12 on the body frame 26, is fitted with two internal thread sections 52, in each of which a screw 54 is screwed in, which passes through a corresponding opening in a doubled upper support flange 56 of the body frame 26. These screws 54 are still accessible even after the assembly of the vehicle roof 12 on the body frame 26 has been carried out, by means of loosening the lower layer 38 of the inner shell 32 from the inner door seal 42 and bending down the lower layer 38. Finally, as can be seen in the view in FIG. 3, the fastening element 28, on its section projecting into the gap 24 over the edge 50 has a recess 58 which is formed in the nature of an undercut on both sides, in which, when the load carrier 10 is assembled, the relevant retaining element 20 and 22 interlocks.

The carrier frame 18 is a hollow sheet metal part along the vehicle roof 12, i. e. in FIG. 2 open to the left, preferably made of steel sheet, with an end panel 60 for storing the retaining elements 20, 22, a lower panel 62, which lies flat on the vehicle roof 12 with an intermediate layer of soft rubber (for ease of representation not shown in the illustrations) (see FIGS. 2 and 4), an upper panel 64, to which the transverse tie bar 14 formed from a drawn steel profile section, which in the cross section essentially has the form of a triangle, is fastened by an elastic buffer element 66 made, e.g., of rubber, and two symmetrically formed side panels 68, which connect the end panel 60, the lower panel 62 and the upper panel 64 with one another and enclose an angle to one another, so that the load carrier foot 16 seen from the side essentially shows overall the form of a triangle (see FIGS. 3 and 4).

In accordance with FIGS. 2 and 3, the retaining elements 20, 22, preferably made of a metal material, are sheet metal parts, i. e., they have considerably greater dimensions in two directions which are vertical to one another (FIG. 3) than in a third direction which is vertical to the first two directions (FIG. 2). While the retaining element 20 shown on the left in FIG. 3 is connected firmly to the end panel 60 of the carrier frame 18 at its top end by means of a number of connection points 70, the retaining element 22 shown on the right in FIG. 3 is linked by its upper end to the end panel 60 of the carrier frame 18 and is swivelable, for which a threaded bolt 72 is attached to the end panel 60, which passes through an opening (not shown) in the retaining element 22 and on which a self locking nut 74 is screwed for securing the retaining element 22.

The upper end of the retaining elements 20, 22, as shown in FIGS. 2 and 3, lie flat on the end panel 60. In the further course of the retaining elements 20, 22 these are then initially angled away from the end panel 60 and then towards it again (FIG. 2), in such a way that the lower ends 76, 78 of the retaining elements 20, 22 can be inserted plane parallel into the gap 24. As can be seen clearly in FIG. 3, the retaining elements 20, 22 are formed like a hook in mirrored symmetrical fashion at their lower ends 76, 78 which engage in the gap 24, and when the load carrier 10 is fastened, grasp and interlock on the complementarily shaped recesses 58 of the fastening element 28 with their hook shaped lower ends 76, 78.

In addition, a device 80 is provided between the retaining elements 20, 22 for optional pulling of the swivelable retaining element 22 in the direction of the fixed retaining element 20. This setting device 80 consists of a cap screw 82, a nut 84 belonging to it and a screw pressure spring 86. The cap screw 82 passes through openings (not shown) which are formed in abutment frames 88, 90, which are attached in a suitable manner firmly to the retaining element 20 and 22 in question. In accordance with FIG. 3, the cap screw 82 lies with its head on the abutment frame 90 of the swivelable retaining element 22, while the end of the cap screw 82, which projects over the abutment frame 88 of the fixed retaining element 20, is screwed into the fixed nut 84 arranged on abutment frame 88. The screw pressure spring 86 is provided on the outer circumference of the cap screw 82 and the end is supported on the abutment frames 88, 90 of the retaining elements 20, 22, in order to apply a force pushing the retaining elements 20, 22 apart. It can be seen that the swivelable retaining element 22 is pulled in the direction of the fixed retaining element 20 by screwing the cap screw 82 further into the nut 84, while the screw pressure spring 86 guarantees that the swivelable retaining element 22 swivels away from the fixed retaining element 20, if the cap screw 82 is screwed further out of the nut 84 in the opposite direction of rotation.

Finally, another cover 92, preferably made of plastic, is shown in FIGS. 2 and 3, which is fastened on to the end panel 60 of the carrier frame 18 by means of a fastening device 94 (which is only shown schematically) and is detachable, in order to cover the retaining elements 20, 22 and the setting device 80. The cover 92 follows the shape of the carrier frame 18 in respect of its outer form and can be the same colour as the vehicle roof 12.

For assembling the load carrier 10, this is placed on the top of the vehicle, whereby the retaining elements 20, 22 on the load carrier feet 16 fitted on both sides of the transverse tie bar are inserted into the relevant gap 24, until the fixed retaining element 20 in FIG. 3 on the left of the fastening element 28 and the swivelable retaining element 22 in FIG. 3 on the right of the fastening element 28 reaches the support flange 56 of the body frame 26. Now the load carrier foot 16 in FIG. 3 is moved to the right until the hook shaped lower end 76 of the fixed retaining element 20 interlocks with the corresponding recess 58 of the fastening element 28. Then the cap screw 82 of the setting device 80 is screwed into the nut 84 against the force of the screw pressure spring 86, whereby the swivelable retaining element 22 is swivelled in the direction of the fastening element 28, until its hook shaped lower end 78 also interlocks in the corresponding recess 58 of the fastening element 28. The result is that the load carrier foot 16 is braced firmly with the fastening element 28. Finally, the cover 92 is fastened on the carried frame 18. Disassembly of the load carrier 10 is carried out in the reverse sequence, whereby, when the setting device 80 is loosened, the screw pressure spring 86 presses the swiveleable retaining element 22 from the fixed retaining element 20, and thus presses the lower end 78 out of the interlock with the corresponding recess 58 of the fastening element 28.

A device is disclosed for detachable fastening of a load carrier, in particular a roof rack, on a vehicle, which has a carrier frame on which two retaining elements are fitted, which are relatively mobile to one another when the load carrier is in unfastened condition. When the load carrier is in fastened condition the retaining elements engage in a gap between a body frame on the vehicle side and a flat body part attached to this, where they interlock on a fastening element on the body frame. The result is that the load carrier can be fastened to the vehicle easily and securely.

While the invention has been described and illustrated by way of a preferred embodiment of the invention, it will be understood to those skilled in the art that various changes in form and detail may be made without departing from the spirit and scope of the invention as defined in the appended claims.

What is claimed is:

1. A vehicle load carrier assembly, comprising;

a body frame;

a roof part supported relative to the body frame such that a gap exists between the body frame and the roof part, the roof part having a rigid outer shell and a plastic material inner shell;

a fastening element having at least a portion that is within the gap between the body frame and the roof part, the fastening element having one side secured to the inner shell of the roof part and another side positioned against a corresponding portion of the body frame such that the roof part is secured to the body frame through the fastening element;

a carrier frame;

a first retaining element supported on the carrier frame; and a second retaining element supported on the carrier frame, the first and second retaining elements being supported on the carrier frame to permit relative movement between the retaining elements prior to the retaining elements engaging the fastening element, the retaining elements engaging the fastening element to secure the load carrier to the vehicle.

2. The assembly of claim 1, wherein a portion of the fastening element projects from the roof part into the gap beyond an outer edge of the outer shell.

3. The assembly of claim 1, wherein the fastening element comprises a metal material and includes at least one internal thread section into which a threaded member is received, the threaded member passing through a flange of the body frame when the roof part is mounted on the body frame.

4. The assembly of claim 1, wherein the retaining elements comprise metal and include a hook at one end, each hook being inserted into the gap and engaging a complimentary surface on the fastening element when the load carrier is in a fastened condition.

5. The assembly of claim 1, wherein the carrier frame lies flat on the roof part and including a resilient intermediate layer between the carrier frame and the roof part.

6. The assembly of claim 1, including a transverse tie bar that is supported by the carrier frame and including an elastic buffer element on the carrier frame to which the tie bar is fastened.

* * * * *